US007948098B2

(12) United States Patent
Liu

(10) Patent No.: US 7,948,098 B2
(45) Date of Patent: May 24, 2011

(54) ELECTRIC ROTARY STARTER FOR AN ENGINE OF A RADIO CONTROL MODEL

(76) Inventor: Nai Wen Liu, Taichung (TW)

(*) Notice: Subject to any disclaimer, the term of this patent is extended or adjusted under 35 U.S.C. 154(b) by 383 days.

(21) Appl. No.: 12/313,357

(22) Filed: Nov. 20, 2008

(65) Prior Publication Data

US 2010/0001524 A1 Jan. 7, 2010

(30) Foreign Application Priority Data

Jul. 4, 2008 (TW) .............................. 97211898 U

(51) Int. Cl.
*F02N 11/00* (2006.01)
*H02P 9/04* (2006.01)

(52) U.S. Cl. ..................... 290/33; 290/38 R; 123/179.1; 123/179.28

(58) Field of Classification Search .................. 290/1 R, 290/38 R, 38 A, 38 C, 33, 31; 123/179.27, 123/179.6, 306, 185.3, DIG. 3, 179.5, 179.28, 123/179.29, 179.25, 179.1; 74/6
See application file for complete search history.

(56) References Cited

U.S. PATENT DOCUMENTS

| | | | | |
|---|---|---|---|---|
| 3,766,399 | A * | 10/1973 | Demetrescu | 290/40 R |
| 4,532,431 | A * | 7/1985 | Iliev et al. | 290/4 R |
| 6,222,294 | B1 * | 4/2001 | Stacy et al. | 310/112 |
| 6,997,155 | B1 * | 2/2006 | Lu | 123/179.25 |
| 7,597,080 | B1 * | 10/2009 | Liu | 123/179.27 |
| 2003/0079558 | A1 * | 5/2003 | Muehlbauer | 74/6 |
| 2003/0079706 | A1 * | 5/2003 | Muehlbauer | 123/179.25 |
| 2005/0278919 | A1 * | 12/2005 | Liu | 29/270 |
| 2006/0288807 | A1 * | 12/2006 | Liu | 74/6 |
| 2008/0087118 | A1 * | 4/2008 | Lu | 74/6 |
| 2009/0183708 | A1 * | 7/2009 | Liu | 123/179.25 |
| 2010/0251994 | A1 * | 10/2010 | Liu | 123/306 |

* cited by examiner

*Primary Examiner* — Julio Gonzalez

(57) ABSTRACT

An electric rotary starter for an engine of a radio control model includes a motor mounted therein. A drive shaft is electrified and longitudinally connected to the motor and rotated by the motor. A conduct tube is electrified and movably sleeved on the drive shaft, wherein the conduct tube is insulated from the drive shaft. When starting the engine, the drive shaft is longitudinally inserted into the engine for providing torsion. Simultaneously, the conduct tube is longitudinally moved relative to the drive shaft to make the front end of the conduct tube contract with the engine. The conduct tube and the drive shaft from a circuit and the power from the electric rotary starter is transmitted to the spark plug in the engine to make the spark plug sparkle for starting engine.

4 Claims, 6 Drawing Sheets

ELECTRIC ROTARY STARTER FOR AN ENGINE OF A RADIO CONTROL MODEL

BACKGROUND OF THE INVENTION

1. Field of the Invention

The present invention relates to an electric rotary starter, and more particularly to an electric rotary starter for an engine of a radio control model.

2. Description of Related Art

A conventional engine (1) of a radio control model in accordance with the prior art shown in FIG. 6 comprises chamber (2) defined therein, a piston (3) reciprocally movably received in the chamber (2), a crank (4) connected to a bottom of the piston (3), a T-shaped shaft (5) connected to the crank (4), a gear box (6) connected to the T-shaped shaft (5) and a seat (7) disposed on a outer periphery of the gear box (6). An electric tool (8) provides torsion into the gear box (6) for sequentially drive the T-shaped shaft (5), the crank (4) and the piston (4) for starting the engine (1). The operator must deeply insert a sparkler (9) into the engine (1) and electrically connecting to the spark plug (1A) to make the spark plug (1A) sparkle when starting the engine (1).

However, the operator must use one hand to operate the electric tool (8) and insert the sparkler (9) into the engine (1) with the other hand. It is very inconvenient and a bad connection may be occurred between the sparkler (9) and the spark plug (1A). As a result, the user may not successfully start the engine (1).

The present invention has arisen to mitigate and/or obviate the disadvantages of the conventional engine for a radio control model.

SUMMARY OF THE INVENTION

The main objective of the present invention is to provide an improved electric rotary starter for an engine of a radio control model, which provides torsion and make the spark plug sparkle at the same time.

To achieve the objective, the electric rotary starter in accordance with the present invention comprises a motor mounted therein. A drive shaft is electrified and longitudinally connected to the motor and rotated by the motor. A conduct tube is electrified and movably sleeved on the drive shaft, wherein the conduct tube is insulated from the drive shaft.

When starting the engine, the drive shaft is longitudinally inserted into the engine for providing torsion. Simultaneously, the conduct tube is longitudinally moved relative to the drive shaft to make the front end of the conduct tube contract with the engine. The conduct tube and the drive shaft from a circuit and the power from the electric rotary starter is transmitted to the spark plug in the engine to make the spark plug sparkle for starting engine.

Further benefits and advantages of the present invention will become apparent after a careful reading of the detailed description with appropriate reference to the accompanying drawings.

DETAILED DESCRIPTION OF THE INVENTION

Figure 1:
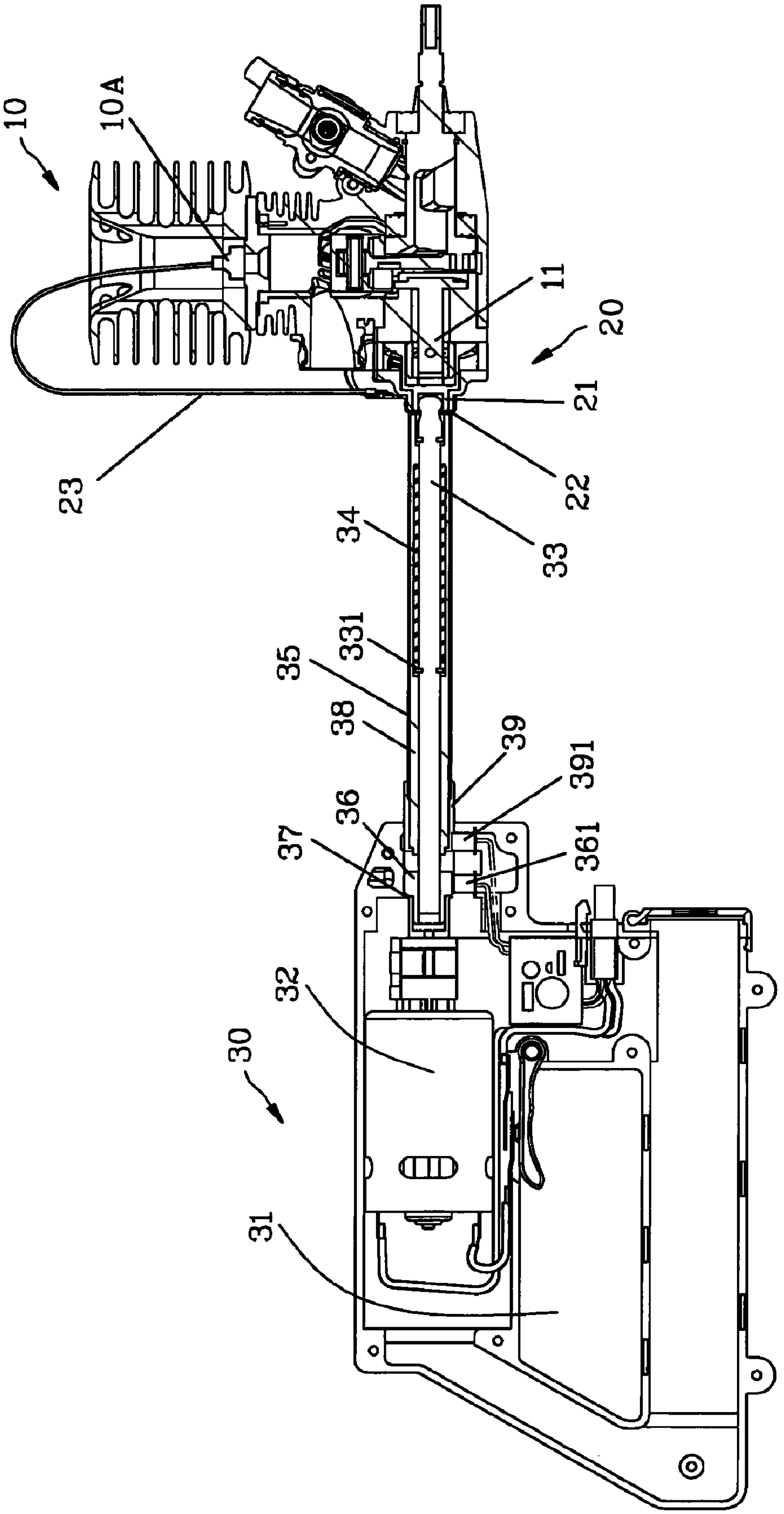
FIG. 1 is a schematic view of an electric rotary starter for an engine of a radio control model in accordance with the present invention.

Referring to the drawings and initially to FIGS. 1-5, an electric rotary starter (30) for an engine of a radio control model in accordance with the present invention is provided to provide torsion and power to the engine (10) at the same time for starting the engine (10).

The engine (10) has an input axle (11) for receiving the torsion. A drive device (20) is laterally mounted to the engine (10) for driving the input axle (11). At least one drive seat (21) is rotatably mounted in the drive device (20) and longitudinally connected to the input axle (11) for driving the input axle (11). A conduct ring (22) is securely sleeved on the at least one drive seat (21) and has a terminal (221) extending from the conduct ring (22). The terminal (221) is electrically connected to a spark plug (10A) via a wire (23) and the spark plug (10A) is mounted in the engine (10).

The electric rotary starter (30) has a power source (31) and a motor (32) respectively mounted therein. The power source (31) is electrically connected to the motor (32) for providing power to the motor (32). A drive shaft (33) is longitudinally mounted to the motor (33) and rotated when the motor (32) is operated. Two stoppers (331) are respectively mounted on a front end and a middle of the drive shaft (33), and a spring (34) is sleeved on the drive shaft (33) between the two stoppers (331). A conduct tube (35) is sleeved on the drive shaft (33) and movably relative to the driver shaft (33). A conduct tube (35) and the drive shaft (33) are insulated from each other. The conduct tube (35) and the drive shaft (33) are respectively electrically connected to the positive pole and the negative pole of the power source (31).

A first conduct connector (36) is mounted to a rear end of the drive shaft (33) and securely connected to the motor (32) via an insulate seat (37) such that the drive shaft (33) is rotated when the motor (32) is operated.

A pair of insulate linings (38) is disposed between the drive shaft (33) and the conduct tube (35). A second conduct connector (39) is mounted to a rear end of the pair of insulate linings (38) and electrically connected to the conduct tube (35). A first conduct plate (361) and a second conduct plate (391) are respectively electrically connected to the negative pole and the positive pole of the power source (31), and respectively contracted with first conduct connector (36) and the second conduct connector (39).

Figure 2:
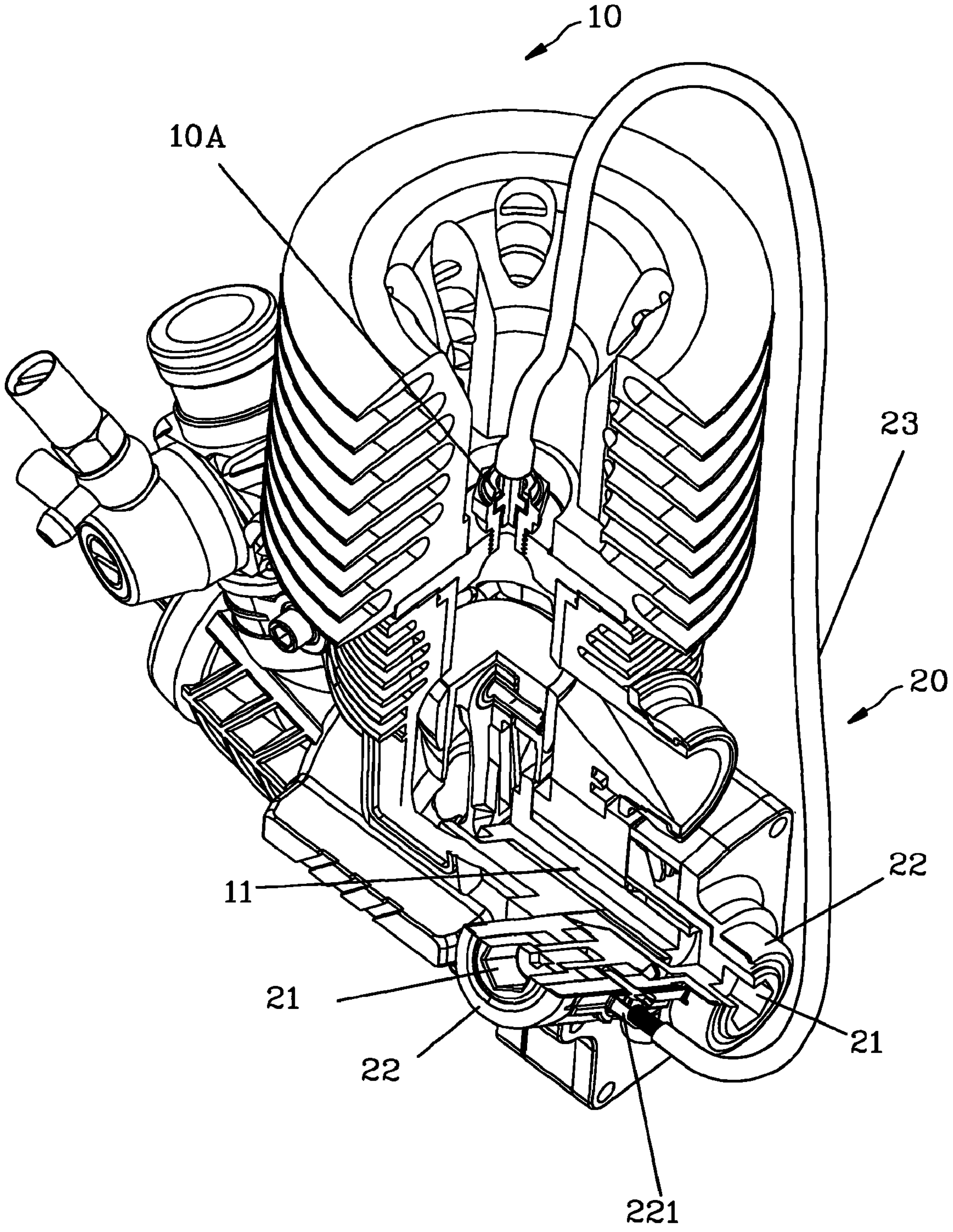
FIG. 2 is a perspective view of the engine of the radio control model in partial cross-section.
Figure 3:
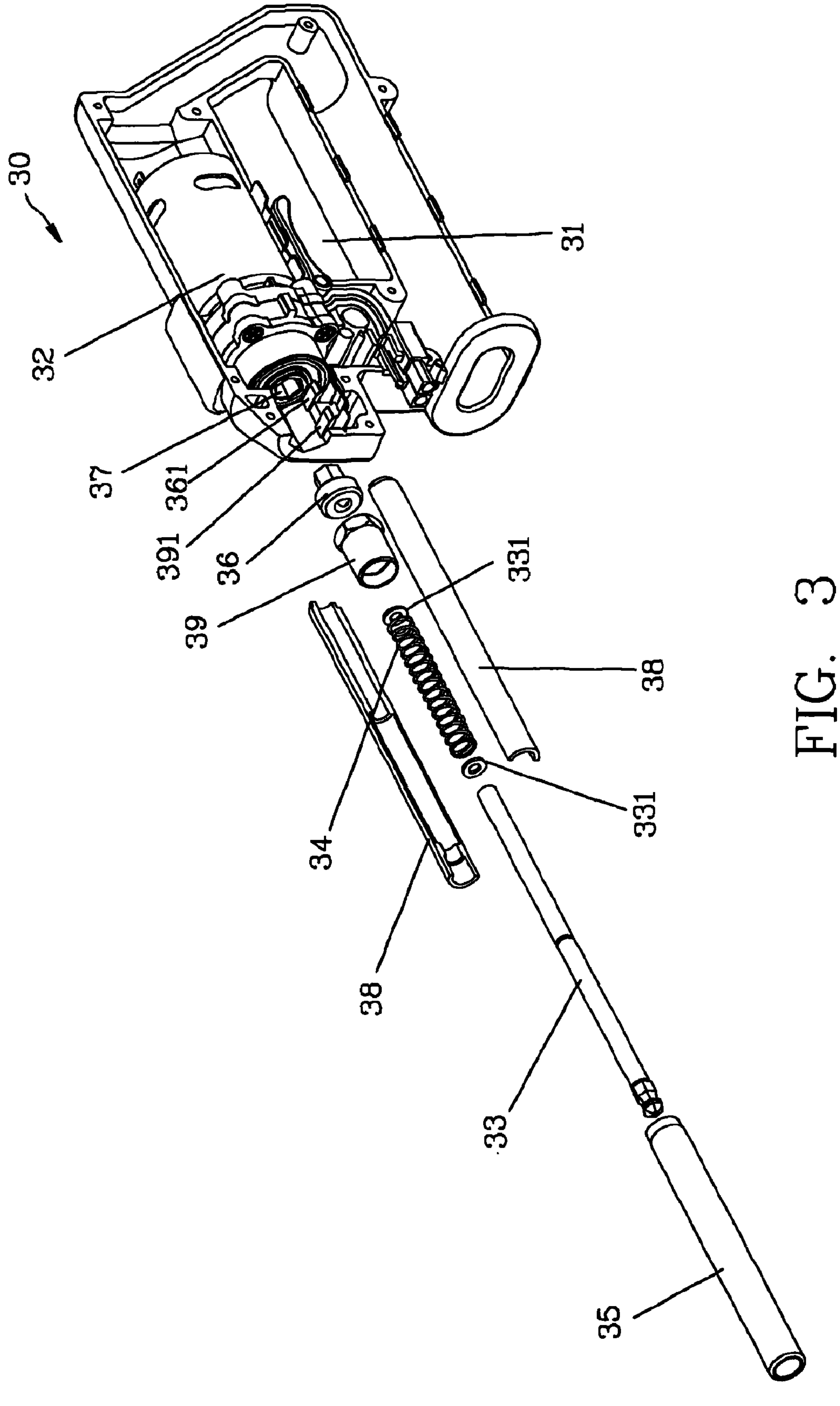
FIG. 3 is a partially exploded of the electric rotary starter in accordance with the present invention.
Figure 4:
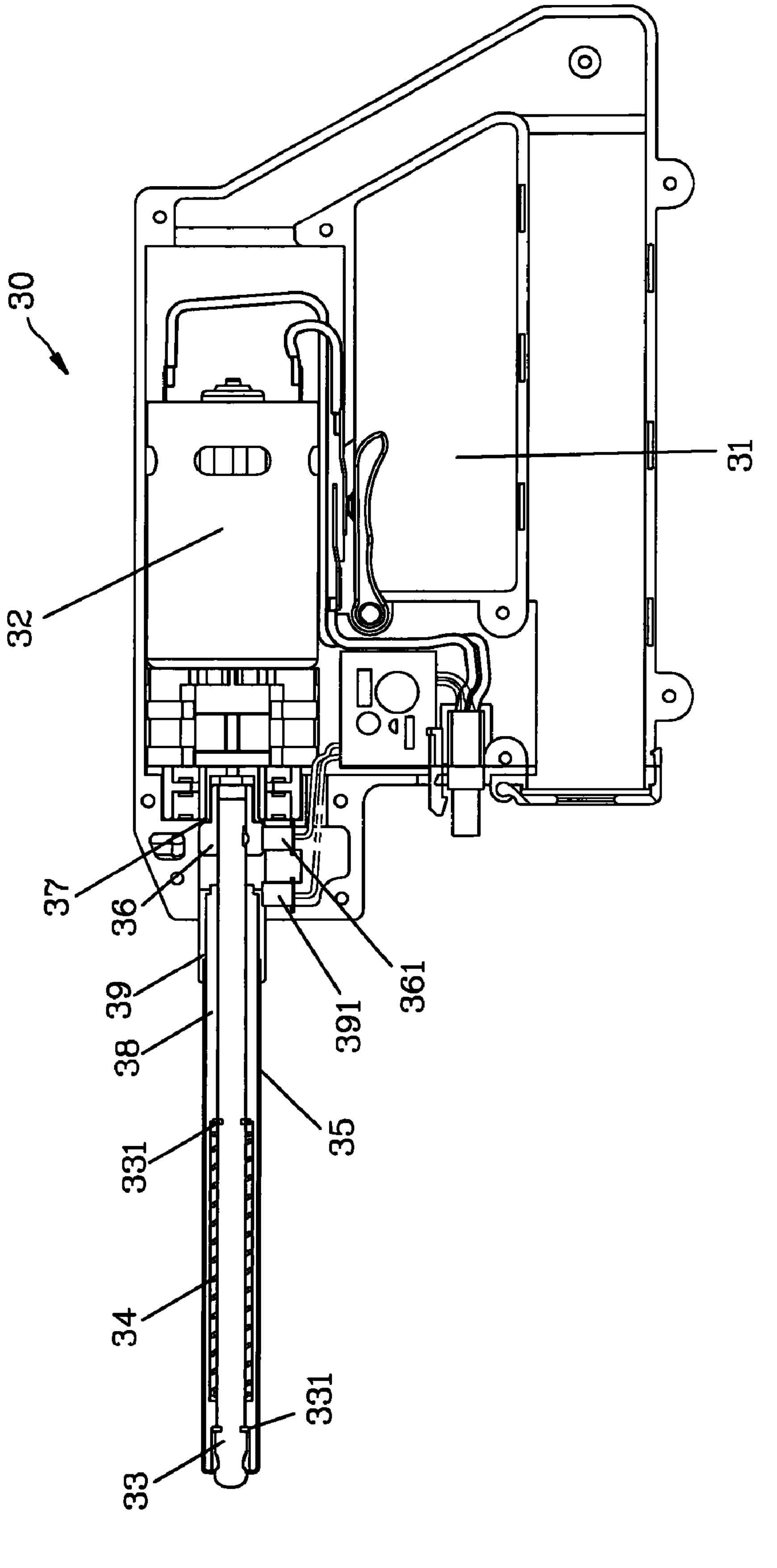
FIG. 4 is a cross-sectional view of the electric rotary starter in accordance with the present invention.
Figure 5:
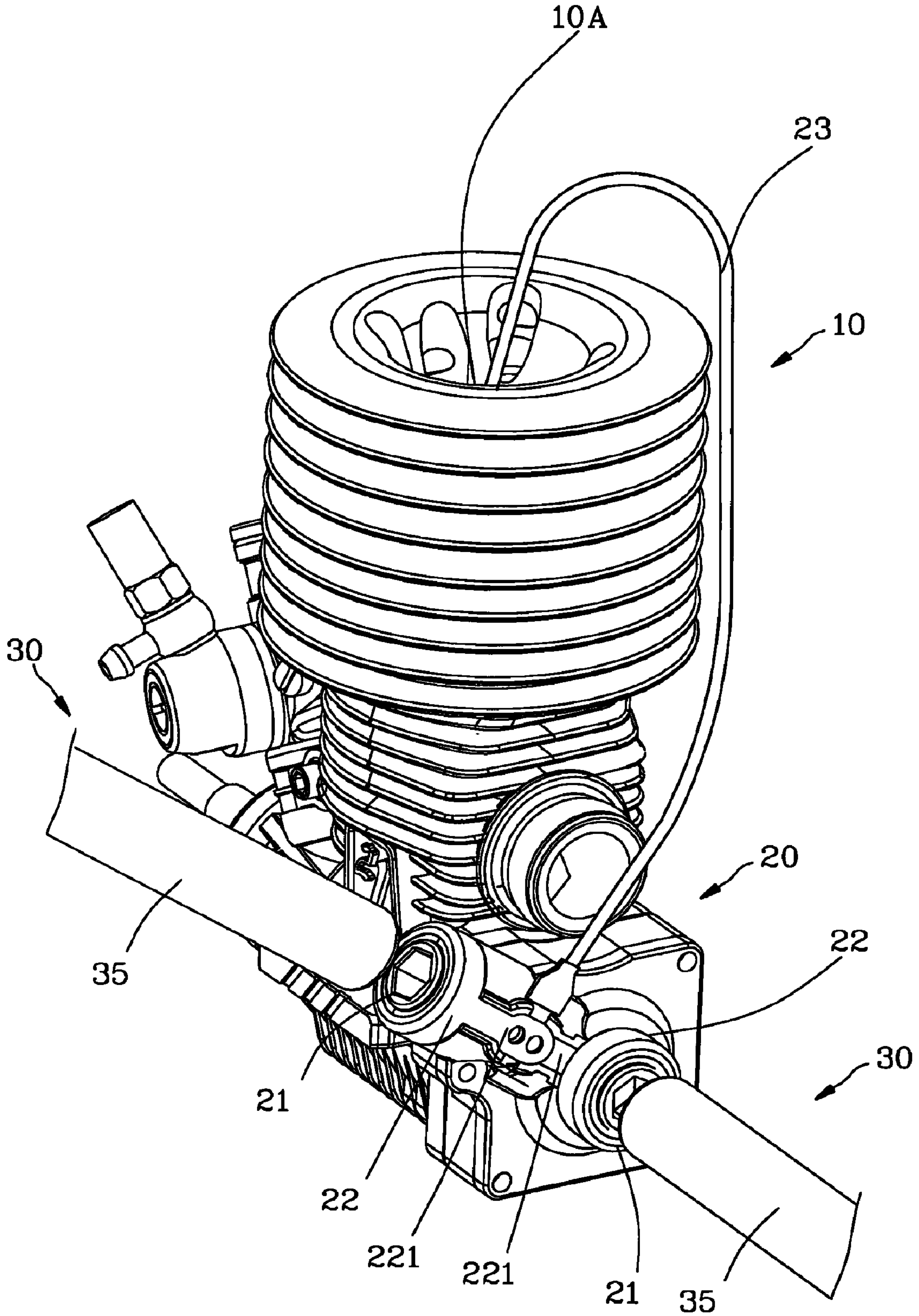
FIG. 5 is an operational view of the electric rotary starter in accordance with the present invention.
Figure 6:
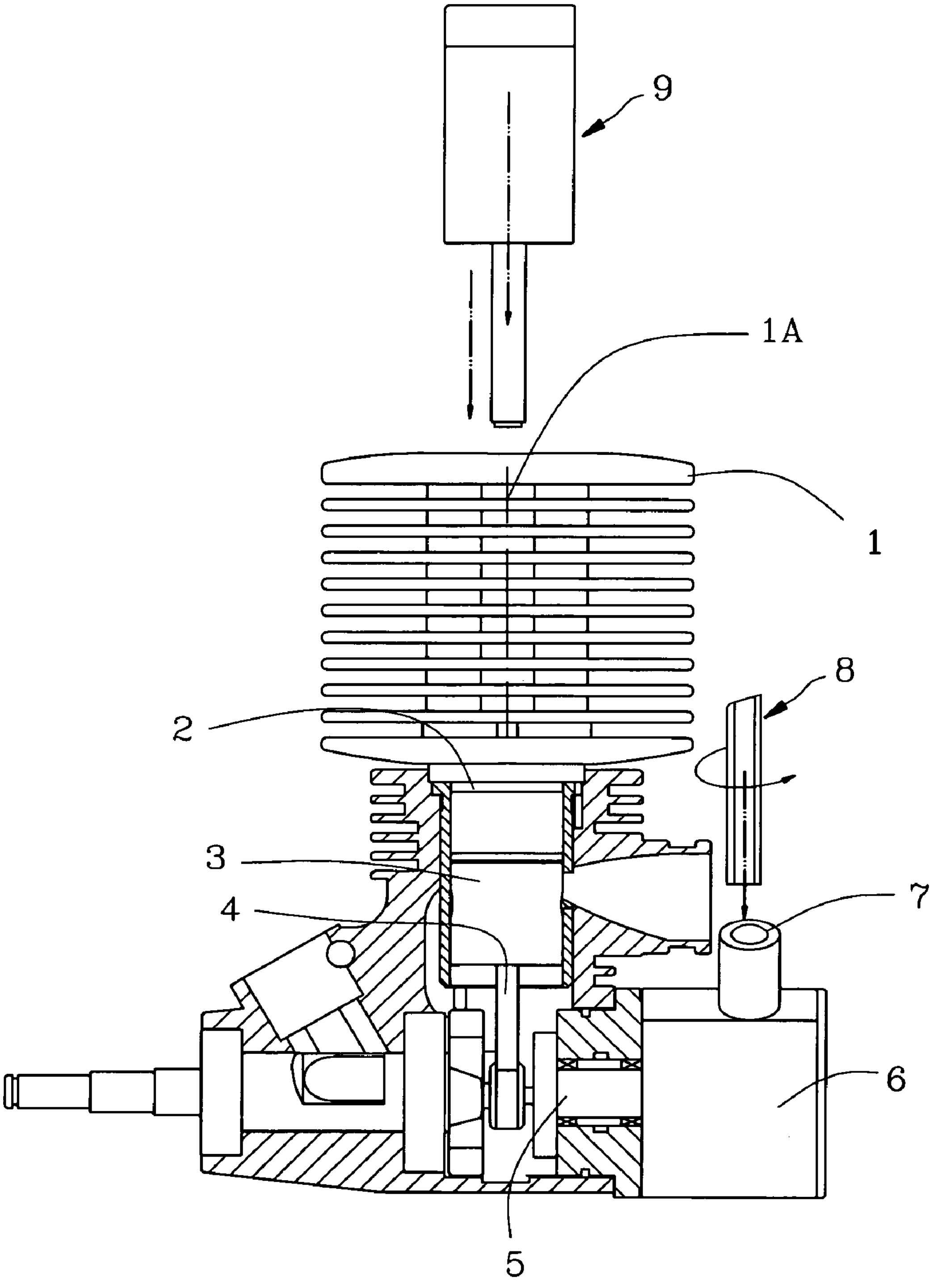
FIG. 6 PRIOR ART
FIG. 6 is an operational view of a conventional engine for a radio control model in accordance with the prior art.

With reference to FIGS. 1 and 2, when starting the engine (10), the front end of the drive shaft (33) is longitudinally inserted into the at least one drive seat (21) such that the torsion is transmitted into the engine (10) via the at least one drive seat (21) and the input axle (11). Simultaneously, the spring (34) is compressed and the conduct tube (35) is longitudinally moved relative to the drive shaft (33) to make the front end of the conduct tube (35) contract with the conduct ring (22). As a result, the conduct tube (35) and the drive shaft (33) from a circuit and the power from the power source (31) is transmitted to the spark plug (10A) in the engine (10) via the terminal (221) and the wire (23) to make the spark plug (10A) sparkle for starting engine (10).

Although the invention has been explained in relation to its preferred embodiment, it is to be understood that many other possible modifications and variations can be made without departing from the spirit and scope of the invention as hereinafter claimed.

What is claimed is:

1. An electric rotary starter for an engine of a radio control model, wherein the engine includes engine has an input axle for receiving the torsion, a drive device is laterally mounted to the engine for driving the input axle and at least one drive seat is rotatably mounted in the drive device and longitudinally connected to the input axle for driving the input axle, the at least one drive seat electrically connected to an spark plug that is mounted in the engine, the electric rotary starter comprising:

a motor mounted therein;

a drive shaft longitudinally connected to the motor and rotated by the motor, wherein the drive shaft is electrified; and a conduct tube movably sleeved on the drive shaft, wherein the conduct tube is electrified and insulated from the drive shaft;

whereby, when starting the engine, the front end of the drive shaft is longitudinally inserted into the at least one drive seat such that the torsion is transmitted into the engine via the at least one drive seat and the input axle, simultaneously, the conduct tube is longitudinally moved relative to the drive shaft to make the front end of the conduct tube contract with the at least one drive seat, as a result, the conduct tube and the drive shaft form a circuit and the power from the power source is transmitted to the spark plug in the engine to make the spark plug sparkle for starting engine.

2. The electric rotary starter as claimed in claim 1 further comprising:

a first conduct connector mounted to a rear end of the drive shaft and securely connected to the motor via an insulate seat such that the drive shaft is rotated when the motor is operated;

a pair of insulate linings disposed between the drive shaft and the conduct tube;

a second conduct connector mounted to a rear end of the pair of insulate linings and electrically connected to the conduct tube; and a first conduct plate and a second conduct plate are respectively electrically connected to the negative pole and the positive pole of a power source that is mounted in the electric rotary starter, and respectively contracted with first conduct connector and the second conduct connector.

3. The electric rotary starter as claimed in claim 1, wherein the drive shaft has two stoppers respectively mounted on a front end and a middle thereof, a spring sleeved on the drive shaft between the two stoppers for providing a restitution force to the conduct tube.

4. The electric rotary starter as claimed in claim 1, wherein the at least one drive seat has a conduct ring mounted thereon and selectively electrically contract with the conduct tube, the conduct ring having a terminal extending therefrom and electrically connected to a spark plug that is mounted in the engine.

* * * * *